United States Patent [19]
Wise et al.

[11] Patent Number: 6,130,676
[45] Date of Patent: Oct. 10, 2000

[54] IMAGE COMPOSITION SYSTEM AND PROCESS USING LAYERS

[75] Inventors: Justin Wise, London; Mark Riches, Croydon; Gilad S. Tiefenbrun; David W. Franklin, both of London, all of United Kingdom

[73] Assignee: Avid Technology, Inc., Tewksbury, Mass.

[21] Appl. No.: 09/053,981

[22] Filed: Apr. 2, 1998

[51] Int. Cl.[7] ........................................... G09G 5/00
[52] U.S. Cl. ............................................... 345/433
[58] Field of Search .................................. 345/429, 431, 345/432, 433, 150

[56] References Cited

FOREIGN PATENT DOCUMENTS

460 970   12/1991   European Pat. Off. .
0 827 112 A2   4/1998   European Pat. Off. .

*Primary Examiner*—Jeffery A. Brier
*Attorney, Agent, or Firm*—Wolf, Greenfield & Sacks, P.C.

[57] ABSTRACT

A layer based paint system permits painting of an image raster of a composite image while viewing subsequent processing on the image raster. The composite image is mapped to an image processing tree. Each of the elements in the image processing tree are defined by an associated data structure that identifies their parent and children elements in the tree. Each of the elements may be, for example, an image element or a process element. Associated with each image element is an image raster and a transform. Viewing and painting of an image element may be done at any level in the image processing tree. Painting of the element directly modifies the pixels in the image raster. The pixel coordinates of brush strokes in the viewed image are transformed into pixel coordinates of the image raster material by applying the inverse transform of the viewed layer, the image element layer and all of the intermediate layers to the pixel coordinates of the brush strokes. The profile of the brush stamp is also transformed by applying the inverse transforms of the image layer and all intermediate layers to the pixel coordinates of the brush stamp. Because the process elements are separated from the image elements in the image processing tree, painting may be performed on any layer while viewing the effects of subsequent processing.

1 Claim, 11 Drawing Sheets

IMAGE COMPOSITION SYSTEM AND PROCESS USING LAYERS

FIELD OF THE INVENTION

This invention relates generally to image editing systems and more particularly to a layer based paint system.

BACKGROUND

The use of computers to change, augment, and reshape original film and video images has been a practice that has steadily been on the rise. A digital film workstation (DFW) may be used to fix problems that originate during the production stage and to create special effects. Many special effects sequences are achieved by layering different images together in one composite frame. A first film or video clip may show an actor in a first location and a background image of a second location may be layered under the actor. The resulting affect is that the actor appears in the second location. A composite image may be a combination of tens of different image layers depending upon the desired special effect.

Frequently it is desirable to add or remove a portion of an image from one of the layers of the composite image. For example it is often necessary to remove unwanted elements, such as the safety wires securing the stunt people, from film sequences. Adding or removing elements from an image requires that a film editor be able to manipulate individual pixels within the composite image. One software tool that enables a film editor to manipulate individual pixels in the composite image is a layer based paint system.

Typical layer based paint systems include an input device, such as a mouse or pressure sensitive tablet coupled to a pointer on a display screen. The movement of the input device mirrors the movement of the pointer so that the user is given the impression of painting directly on an image on the display screen. The layer based paint system allows users to paint new layers, creating new images with their own image and transparency (alpha) information. The layer based paint system also allows the user to paint on existing layers, changing the image and/or alpha information in the layer to add or remove objects from the layers. Using the layer based paint system, it is also often possible to move the layers relative to each other to give them an offset in X and Y directions.

In the simple layer paint systems, each layer is itself an image. The layers are stored as image rasters with image and transparency (alpha) information. If a process is performed on the layer, the process directly modifies the pixels associated with the layer. When the process has been performed on that layer, the layer is indelibly modified.

One advantage of the simple layer based system is that, since each layer is simply an image raster, it is possible to paint directly onto any layer to change the contents of rasters in any layer. There is always a simple one to one relationship between the gestures made using the input device and the changes to be made upon the image. The one to one relationship makes it possible to paint directly onto any layer even if there are layers above it and below it.

One problem with the layer based paint system is that if the artist subsequently wishes to modify a layer, first the processing of the layer must be undone. For example, if the artist rotates a layer, the rotation is applied to the pixels in the image raster to provide an image layer with new, rotated pixel values. To blur the image, a blurring process is applied, updating the image raster with a new, blurred image. To remove the rotation, the process of blurring must first be undone before the rotation is reversed. Once the rotation is reversed, the processing is reapplied to the image. The iterative reprocessing steps performed when modifying an image layer are undesirably time consuming. In addition, repetitive reprocessing of the image may result in the addition of visual artifacts that detract from the quality of the final image.

More advanced layered paint and animation systems use object based architectures. Each layer is an object that may contain an image, an image process (e.g., a blur) that applies a function to the image, or brush strokes, which change the color of selected pixels within the image. Each object retains information about its position, scale, rotation, etc. Because image layers are objects that contain an original image, rotation and scaling information, there is no longer a simple relationship between the gestures a user might make with the input device and the corresponding changes that would have to be made to paint directly on the image raster. As a result, object based paint systems typically dictate that any new paint is applied to a new layer. Accordingly, in such systems it is not generally possible to directly modify the image raster associated with the object without creating a new, modified object. Rather, any modifications to the image raster are made in layers above the image raster.

Known object based systems do not typically allow the effects of processes to be viewed when adding brush stroke layers beneath the process layers. Thus, if a user wishes to modify an image layer, the painted layer is typically generated above the process layers, and when the painting is complete the layers are reordered and the processes may be viewed. Because processing is not done directly to the images, there is no degradation of the image. However, the additional layering steps are time consuming and inconvenient.

SUMMARY OF THE INVENTION

A layer based paint system permits painting of an image raster of a composite image while viewing subsequent processing on the image raster. The composite image is mapped to an image processing tree. Each of the elements in the image processing tree are defined by an associated data structure that identifies their parent and children elements in the tree. Each of the elements may be, for example, an image element or a process element. Associated with each image element is an image raster and a transform. Viewing and painting of an image element may be done at any level in the image processing tree. Painting of the element directly modifies the pixels in the image raster material. The pixel coordinates of brush strokes in the viewed image are transformed into pixel coordinates of the image raster material by applying the inverse transform of the viewed layer, the image element layer and all of the intermediate layers. The profile of the brush used for the brush stroke is also transformed by applying the inverse transforms of the image layer and all intermediate layers. Because the process elements are separated from the image elements in the image processing tree, painting may be performed on any layer while viewing the effects of subsequent processing.

In one aspect, a computer readable medium for storing data accessible by an application program during execution of the application program on a data processing system is provided. The computer readable medium includes an image processing data structure stored in the memory and representing a composite image, the image processing data structure comprising a hierarchically linked coupling of elements. Each of the elements include a type indicator identifying a type of the associated element, a reference to a parent element in the image processing data structure, and references to any child element in the image processing data structure. The types of elements include process elements and image elements, and an order of the hierarchically linked coupling is related to an order of layering of the elements in the composite image.

In another aspect, a method of displaying a composite image represented by a hierarchically ordered coupling of elements is provided. The elements include a pointer to a parent element and at least one pointer to a child element. The elements are apportioned into classes including image elements and process elements with the image elements including an image source and a transform. The method includes the steps of: a) designating all the elements at the lowest level of the hierarchically ordered coupling of elements as current working elements, b) for each current working element that is an image element, transform the image source using the associated image element transform, c) for each current working element that is a process element, process the coupled children according to a process associated with the process element, d) designate the parent elements of the working elements as the working elements. Repeat steps b through d until all of the elements in the image processing tree have been processed. Display an image defined by the image processing tree on the display screen.

In another aspect, a method of painting pixels of a material in a composite image displayed on a display device is provided. The painted pixels are selected in response to pixel coordinate data received from an input device. The composite image is formed from a plurality of hierarchically ordered elements, the elements including image elements and process elements. Each image element identifies a source modified by a transform. The method includes the following step of determining, responsive to the pixel coordinate data received from the input device, coordinates of pixels in the material to be painted. The step of determining further includes the step of storing the pixel coordinate data received from the input device as working pixel coordinate data. For each image element between the image element in the hierarchy corresponding to the displayed composite image and the image element associated with the material to be painted, inclusive, the method includes the steps of a)extracting the transform associated with the image element, b) generating the inverse transform of the extracted transform; and c) applying the inverse transform to the working pixel coordinate data, and d) painting the source of the image element by modifying the values the pixels of the source using the working pixel coordinate data.

In another aspect, a method of adjusting a brush profile for painting pixels of an image raster in a composite image displayed on a display device is provided. The composite image is formed from a plurality of hierarchically ordered elements with the elements including image elements and process elements and with each image element identifying a source modified by a transform. The method includes the steps of a) generating a brush matrix representing a brush profile selected for painting, b) for each image element between the element of the hierarchy of elements corresponding to the displayed composite image and the image element associated with the image raster to be painted, including the image element associated with that image raster, extracting the transform associated with the image element and applying the extracted transform to the brush matrix, and c) inverting the transformed brush matrix to provide a brush profile for painting the image raster.

In another aspect, a graphical user interface for painting a composite image is provided. The composite image includes one or more hierarchically layered elements comprising image elements and process elements. The graphical user interface includes a display window for displaying an image, a hierarchy window for displaying an image processing tree representing the hierarchically layered elements forming a composite image, means for selecting a layer in the hierarchical layer to be displayed in the display window, and means for modifying a first image element at a first layer of the composite image while displaying second image element at a second, relatively higher, layer of the composite image.

DETAILED DESCRIPTION

A paint application is provided for editing and animating image data. A frame of film or video is formed from a composite of a number of different image layers. The image layers may be bit maps provided with the software paint application, still images retrieved from an analog frame of video, matte backgrounds painted by a user, etc. Each of the image layers is formed from a matrix of pixels. Each pixel in the matrix includes, among other values, color information indicating a color of the pixel and alpha information. Alpha information identifies the transparency of the pixel and thus indicates which portions of the image are viewable when they are layered in the composite image. Thus, when the image layers are layered, the transparency information indicates which portions of the image layers may be viewed by the user on the display device.

Figure 1:
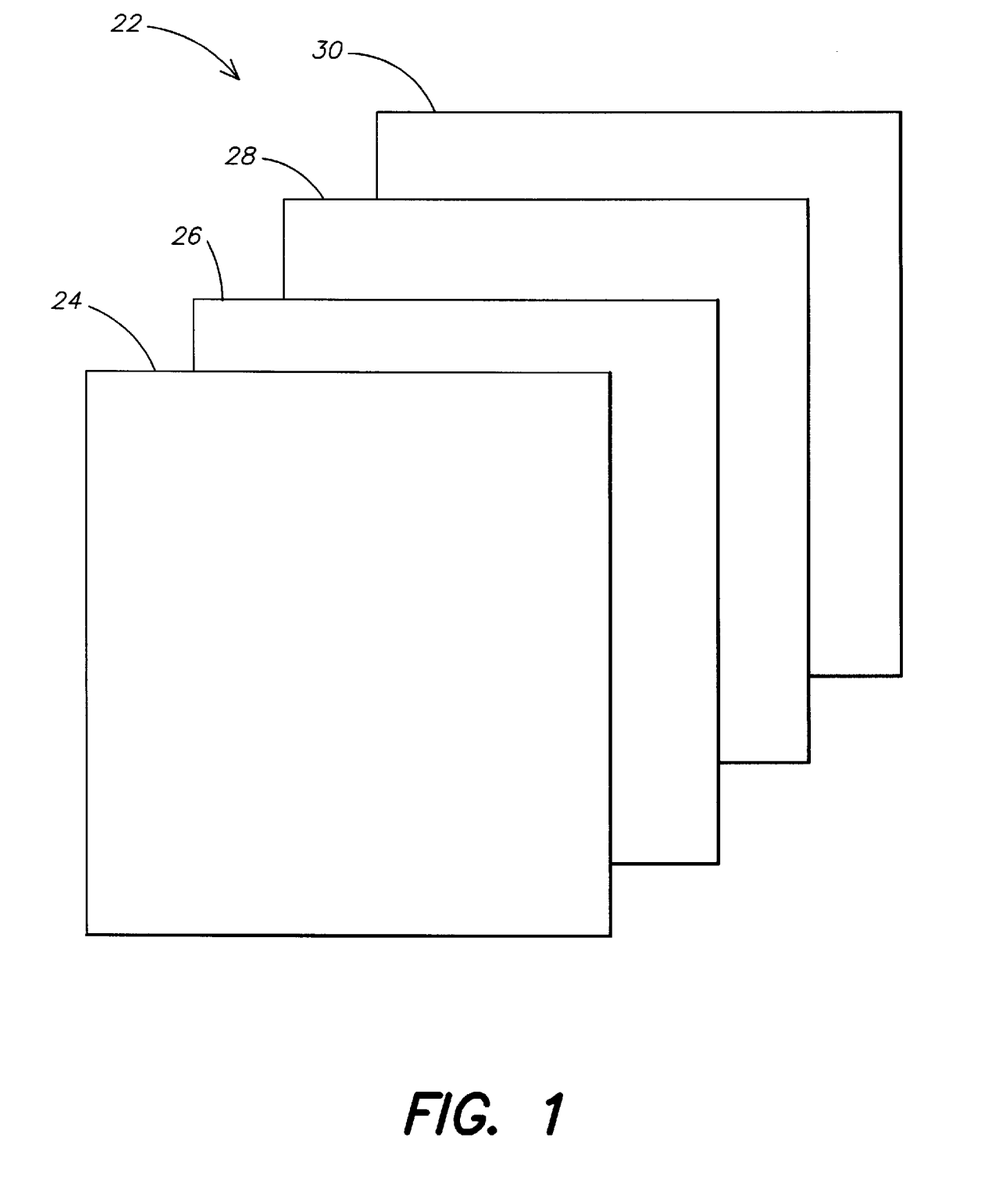
FIG. 1 illustrates a number of layers forming a composite image.

For example, referring now to FIG. 1, an example composite image is shown. The composite image 22 includes a background layer 30, a number of intermediate layers 26 and 28 layered on the background layer 30, and a foreground layer 24 layered on layers 26, 28 and 30. Thus, the image layers form a display hierarchy, where displaying of image layers that are relatively higher in the hierarchy (such as foreground layer 24) includes displaying of layers that are relatively lower in the hierarchy (such as background layer 30).

A variety of processes are capable of being performed on each of the layers of the composite and/or on groups of the sequential layers in the composite image. The types of processes include spatial transforms, filters and paste processes. Spatial transforms include functions for shifting the image rasters in the x-y direction, rotating the image rasters and scaling the size of the image rasters. Filter processes include color transform functions such as tinting and blurring the image rasters. Paste processes (also known as blend processes) include functions for merging two image rasters together or for modifying alpha information of an image raster. Other types of processes, known to those in the art, such as gamma adjusting, color correction etc. also may be used to process the image rasters.

The composite image may be displayed at any level in the hierarchy. For example, a user may display the image starting at the hierarchical level including image layer 28. With such a selection, the displayed composite would include the combination of image raster 28 with image raster 30. When the composite is displayed from the perspective of a selected layer, different layers of each of the image rasters that are relatively lower in the hierarchy are viewable according to the alpha information in each of the respective lower layers.

The composite image also may be accessed for painting at any level of the hierarchy. During painting, the composite may be displayed at the same level of the hierarchy at which painting occurs or alternatively at a higher level within the hierarchy. Viewing the composite at a relatively higher layer within the hierarchy allows the effects of processes that are performed at relatively higher hierarchical levels than the level at which painting is being performed to be displayed during painting. For example, if a tint process is performed at layer 24, and a user selected layer 26 for painting, each brush stroke that is painted on layer 26 would be displayed using the tint process associated with layer 24.

The paint system represents a composite image using an image process data structure. In one embodiment, a tree type data structure is used. However, the present invention is not limited to a tree type data structure and other data structures that allow elements to be linked in a hierarchical manner, such as graph type data structures, may alternatively be used. When using an image processing tree data structure, each 'leaf' of the tree is associated with an image raster. The image raster may be, for example, a stored bit map, a shape generated by the user using the paint system, text, a digitized frame of video or other similar image representation. As each of the image rasters is added to the composite and processed by the user, the image rasters and processing steps are linked together in the image process tree. Thus, the image process data structure defines the composite image.

Figure 2A:
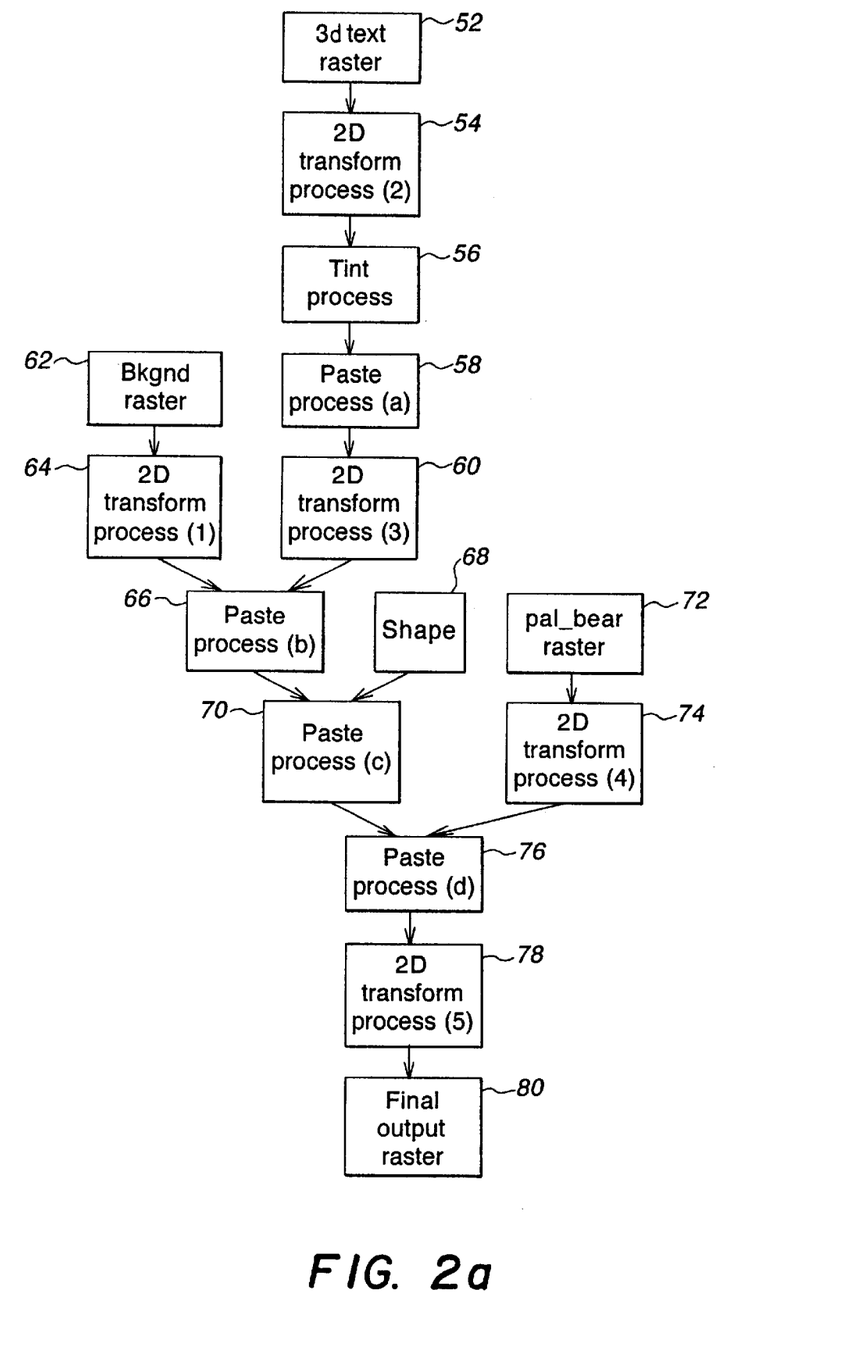
FIG. 2A illustrates an image processing data structure.
Figure 2B:
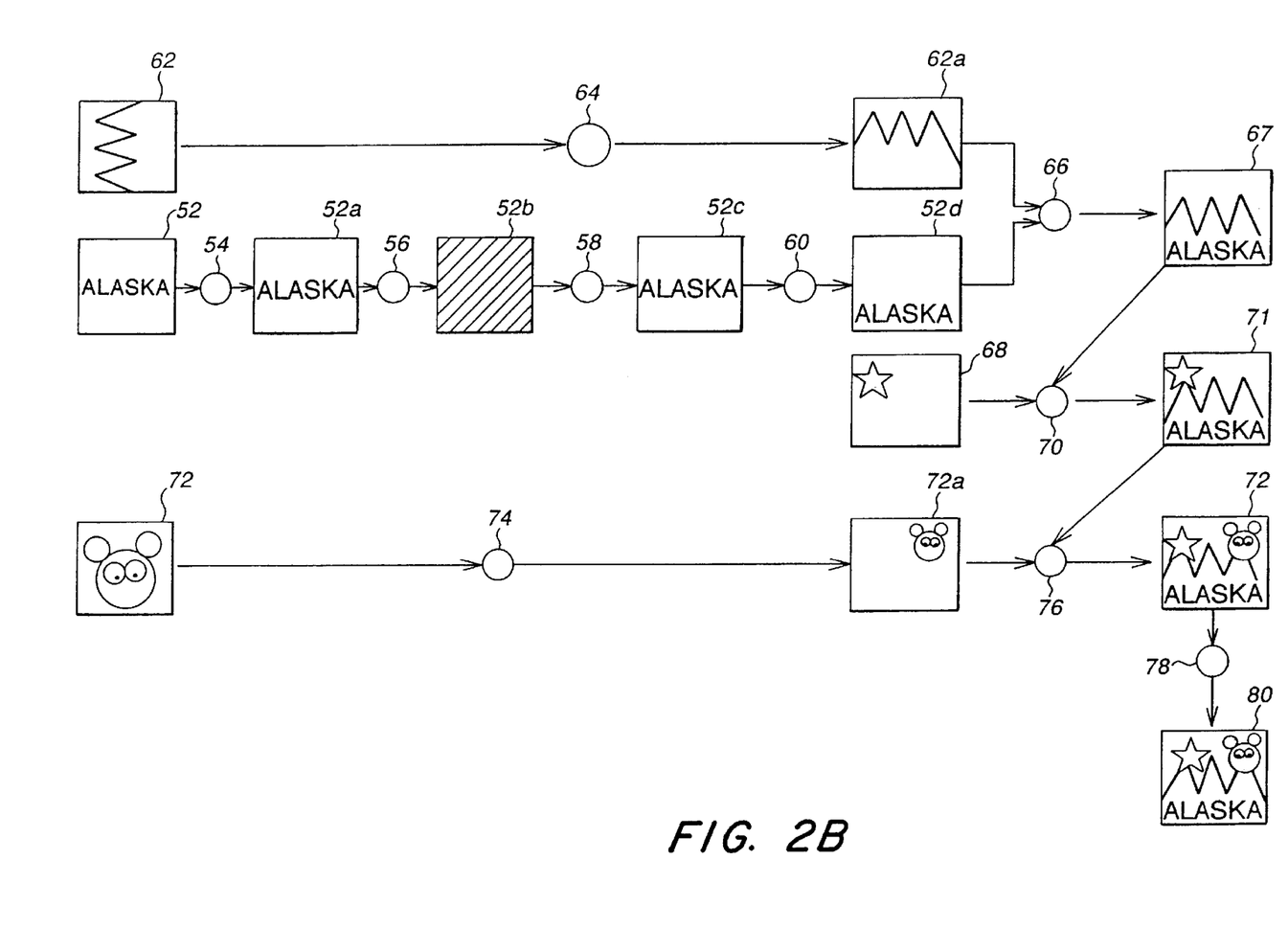
FIG. 2B illustrates an example of a composite image corresponding to the image processing data structure of FIG. 2A.

Referring now to FIGS. 2A and 2B, process tree 50 of FIG. 2A is a definition of the composite image 80 in FIG. 2B. As the user adds layers to the image, the links between the image rasters and processes are created in the tree. For example, the background may be the first layer processed. A background element is formed from the background raster 62 combined with a 2D spatial transform 64. In the composite of FIG. 2B, the background 62 is a mountain scene and 2D spatial transform 64 rotates the mountain scene by ninety degrees. The next layer added in the composite includes a text raster 52. The text raster is transformed by a 2D spatial transform 54 (which scales the size of the text) and filtered by tint process 56. Paste process 58 is then applied to the tinted text raster 52*b* to update alpha information in the tinted text. The paste process 58 acts to remove the tint from all but the text portion of raster 52*b*. The resulting raster 52*c* is transformed using spatial transform process 60 to move the text in the y direction. Paste process 66 combines the resulting image elements 62*a* and 52*d* to provide raster 67. Raster 67 therefore reflects the processing of image rasters in the first and second layer of the composite image.

A shape raster 68 may be generated by the paint tool in response to user input. The shape raster 68 is combined with raster 67 using paint process 70 to provide raster 71. Raster 71 thus reflects the processing of image rasters in the first, second and third layer of the composite image. A stored bit map raster 72 of a bear is next added to the composite. Before adding the bear to the composite, the bit map raster 72 is scaled by 2D spatial transform process 74. The scaled raster 72*a* is then pasted to raster 71 to provide composite image 72. The composite image 72 is then processed using 2D spatial transform 78 to shift the location of the overall image within the frame. The result is composite image 80.

Figure 3A:
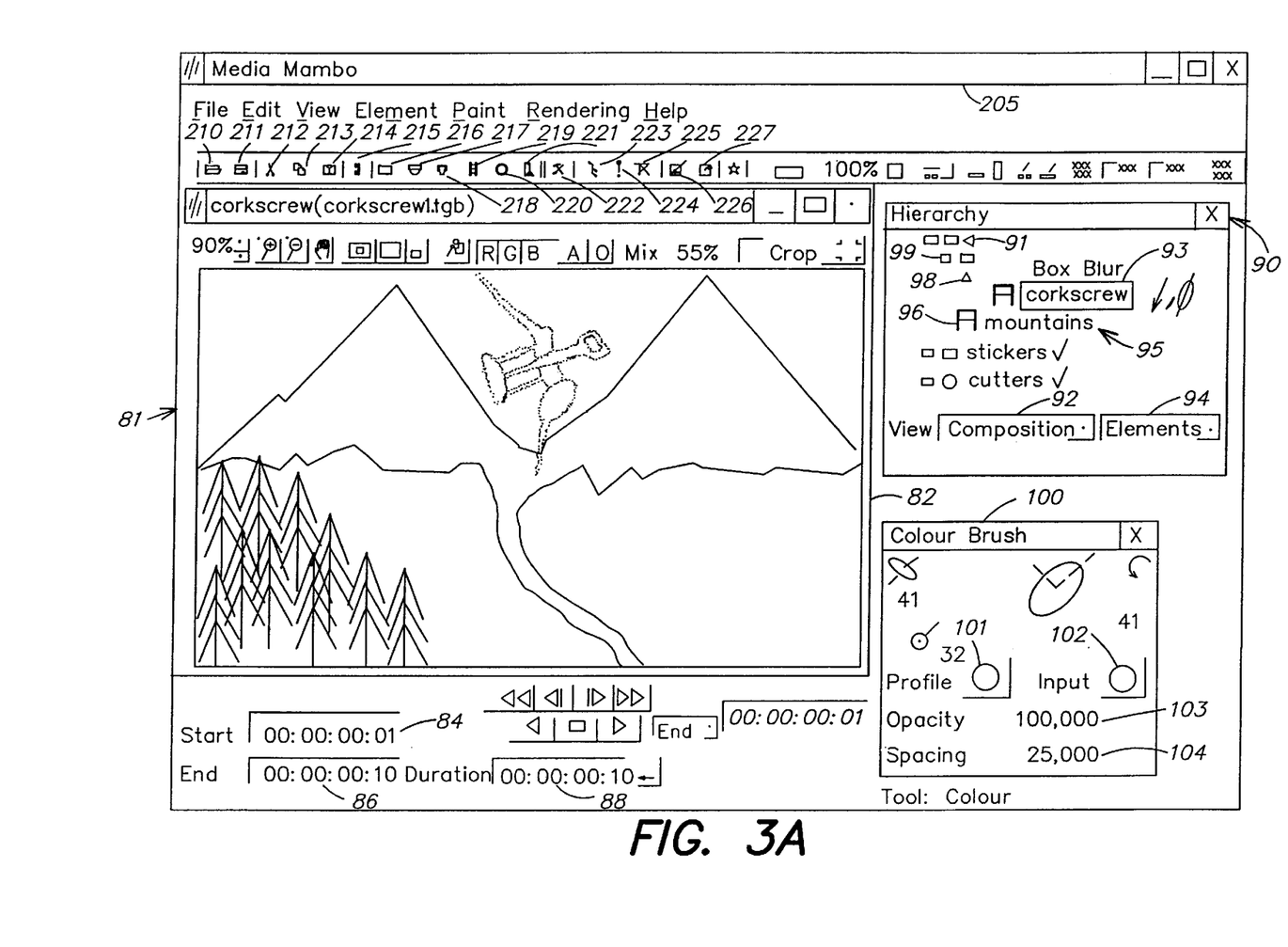
FIGS. 3A–3C illustrate one embodiment a graphical user interface that may be used to build an image processing data structure such as that shown in FIG. 2A.
Figure 3B:
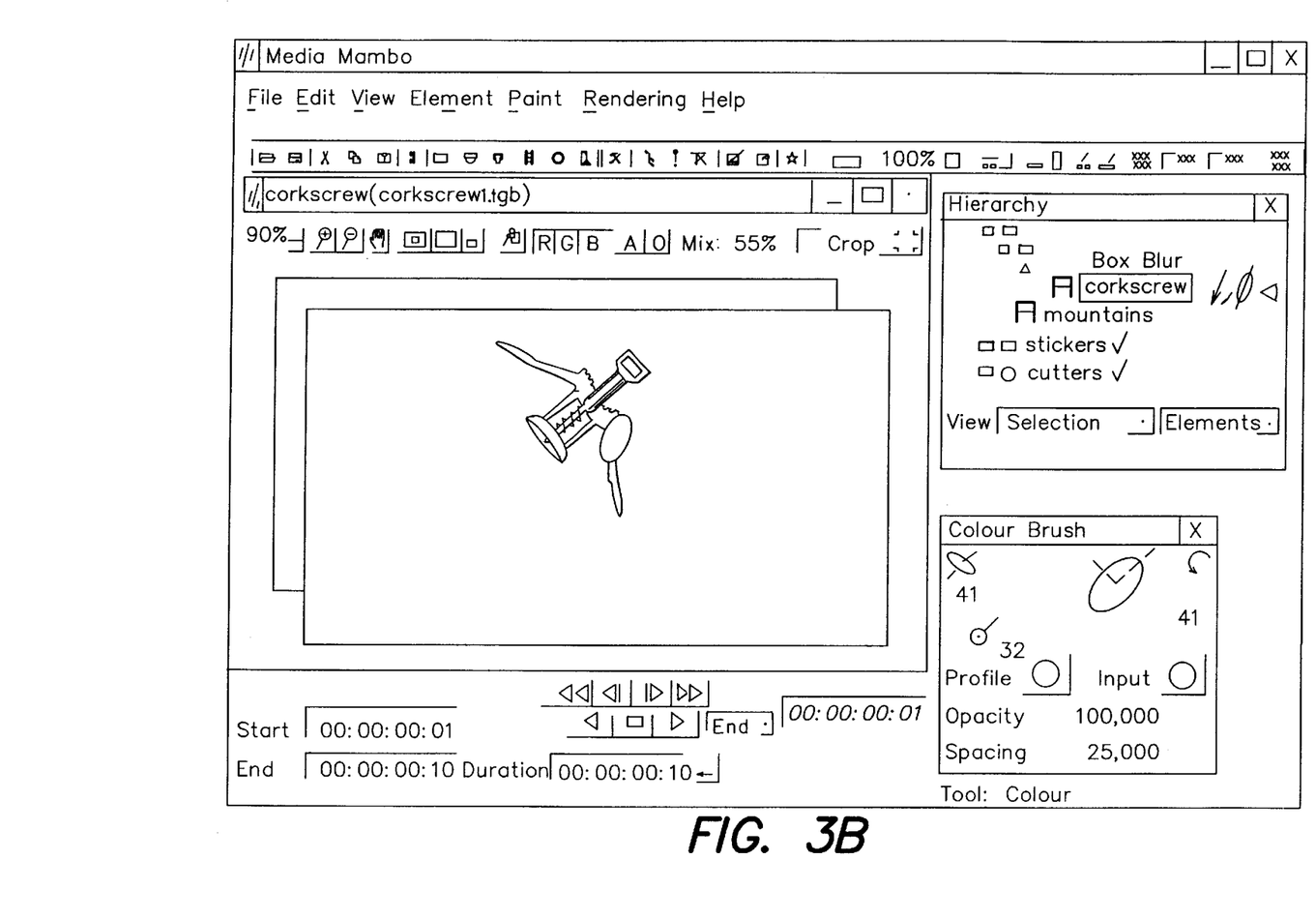
Figure 3C:
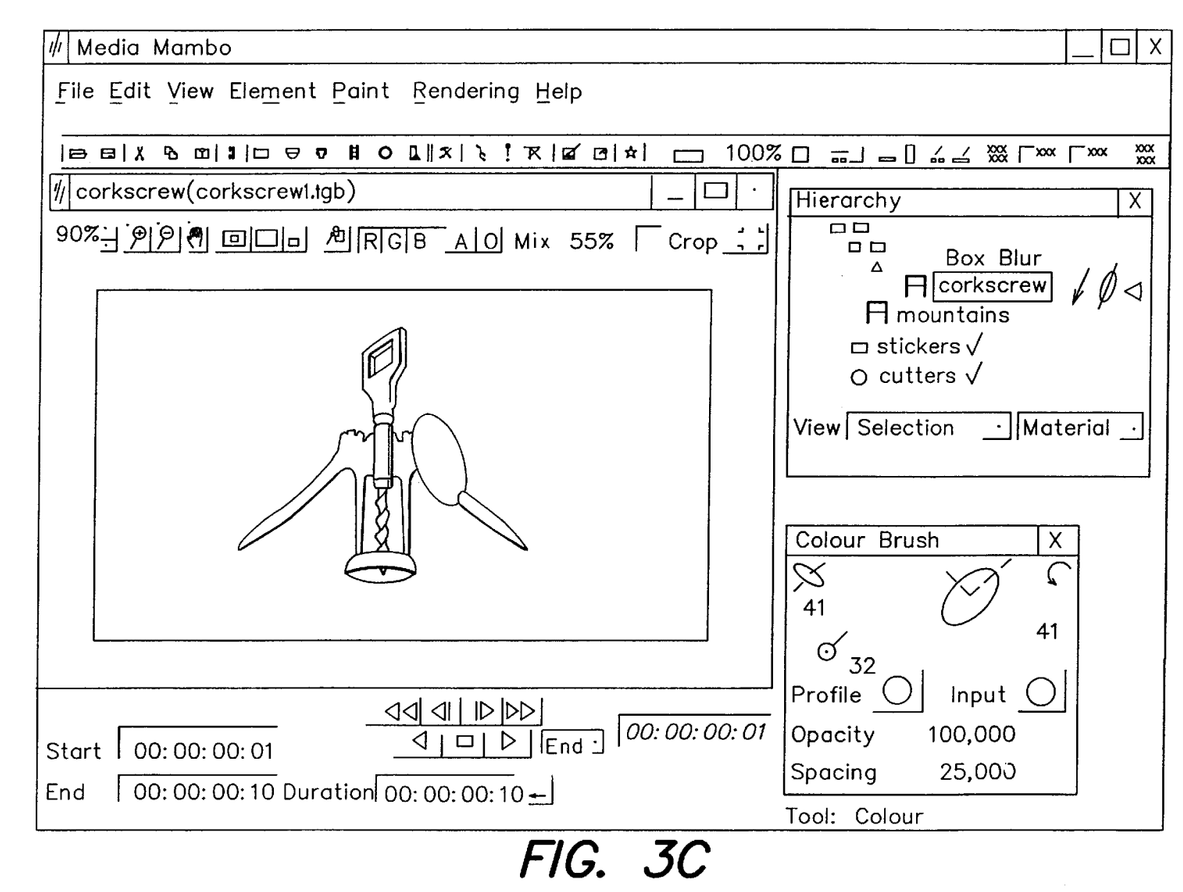

FIGS. 3A–3C illustrate an exemplary graphical user interfaces 81 of a paint application. All of the figures illustrate the same frame of a video sequence, where the frame of the video sequence is a composite of a number of different layers of image elements. However, each figure displays the frame from a different viewpoint: FIG. 3A displays the entire composite image of a blurred corkscrew on a mountain background, FIG. 3B displays the transformed corkscrew element and 3C displays the corkscrew material.

The graphical user interface of the paint application includes a display window 82, a hierarchy window 90 and a brush window 100. The display window displays the composite image of a frame from a selected viewpoint. The display window includes Start time window 84, End time window 86 and Duration window 88. The Start time window 84 identifies the start time of the frame within the video sequence. The End time window 86 identifies the end time of the frame within the video sequence, while the Duration window indicates the number of frames in the video sequence.

The brush window 100 is used to select a brush size, shape and color for painting on the image in the displayed window 80. In particular, the profile control 101 controls the brush stamp of the brush as it is stroked over the image, where the brush stamp is the number and arrangement of pixels affected by each distinct contact of the brush. The input control 102 controls the color of the brush. The opacity control 103 allows the user to select the transparency of the brush, i.e., how much the pixels in the image will be affected during painting. The spacing control 104 allows the user to select a spacing between repeated stamps along each brush stroke. When a brush is selected for painting, the characteristics of the brush and associated brush strokes are defined relative to the displayed image. Thus, if painting is performed on one layer, adjustments to the characteristics of the brush strokes are made when viewing other layers of the composite image. The methods used to adjust the brush stroke are discussed below.

The hierarchy window 90 includes an image processing tree 95 that is built by the user of he paint software as the composite image is created. The image processing tree includes image elements and processes. Image elements include digitized film clips or pre-generated bit-maps which are represented by film clip icons such as icon 96. Image elements also include shapes selected from a shape menu accessible from button bar icon 211. Image elements also includes composite groups of image elements. For example, folder 89 is an image element.

The processes include filter-type processes (including color transform processes such as tint and blur processes) and paste type processes. The filter-type processes are represented by the triangle icon 98, while the paste type processes are implied by the addition of an image element in the processing tree.

A variety of spatial transform type processes are associated with image elements in the image processing tree. As mentioned above, the spatial transform type processes include processes that rotate, scale, move or corner-pin the associated image element. The spatial transform processes are not linked as individual elements in the image processing tree but rather are always implied by their appearance adjacent to the image element which they affect.

The graphical user interface 81 also includes a button bar 205. The selection of a button on button bar 205 causes an associated software application to perform the following functions. Buttons 210–214 are icons, the selection of which are generally known to perform the following functions. In response to selection of button 210, a file is opened. In response to the selection of button 21 1, a displayed edit product is saved. The selection of button 212 causes a selected portion of an image that is displayed to be removed from the display and stored in the buffer. The selection of button 213 causes a selected portion of an image to be copied to the buffer although it remains in the display. The selection of button 214 extracts a previously saved image or image portion from the buffer for pasting into the displayed image.

Buttons 215–227 are used to provide the following paint functions. Button 215 is an import image icon. Selection of button 215 causes an image or sequence of images to be retrieved from a disk for display. As the image is inserted into the display, a name of the image is inserted to the hierarchy. Button 216 is a group icon. Selection of button 216 causes a selected group of elements in the hierarchy to be grouped together. For example, the group may be selected to cause a process to be performed on a group of elements, rather than on individual elements on the hierarchy. Button 218 is an output icon. The selection of button 218 is used to add an element at the top of the hierarchy, thus defining the output element of the image processing tree. Button 219 is a new image icon. The selection of button 219 causes a new image element to be added into the hierarchy. Button 220 is a shape icon. The selection of button 220 causes a list of available shapes to be provided. A user may then select one of the available shapes to paste into the image display. As the shape is pasted into the display, the shape element is positioned at the associated position in the hierarchy. Button 221 is an effect icon. The selection of button 221 causes a pull down menu to be viewed which lists the available effects and processes that may be performed on images or groups of images in the hierarchy. By selecting one of the processes in the pull down menu, that process is applied to the displayed image. In addition, the process is inserted to the corresponding location in the image processing tree.

Button 222 is a hammer/brush icon. The selection of button 222 causes a tool chest to be provided for painting and shape tools. The painting and shape tools, for example, include different types of brushes that may be used for the painting process. Selection of one of these brushes from the tool chest causes that brush to be used during painting. Button 223 is a hierarchy icon. The selection of button 223 causes the hierarchy window to be displayed. Button 224 is an explanation mark icon. The selection of button 224 causes a list of rendering controls to be displayed. One example rendering control, for example, is 3-D rendering. A selection of one of the rendering controls causes that rendering operation to be performed on a selected portion of the displayed image. Button 225 is a graph button. The selection of the 20 graph button 225 results in the display of animation, time lines and graph editors. Button 226 is a brush icon. Selection of the brush icon is used to display brush controls for controlling the size, transparency and other characteristics of the brush selected from the tool chest. Button 227 is the hand icon. The selection of button 227 causes the properties of a selected element to be displayed.

The above windows and icons are merely example icons of one embodiment and not a limiting factor of the present invention. The image processing tree is built by the user using the above described button bar controls.

The generated composite image may be viewed from a variety of perspectives. Included in the image processing tree 95 is an eye icon 91 and a set of View pull down menus 92 and 94. The eye icon controls the hierarchical level at which the composite image is viewed. In FIG. 3A, the eye icon 91 is at the highest level in the hierarchy. Accordingly, the composite image is being viewed from the foreground layer down through all of the layers to the background. In FIGS. 3B and 3C, the eye icon 91 has been moved to the corkscrew level.

In addition to the eye icon 91, the View pull-down menus 92 and 94 control what portion of the selected layer is displayed. The view options provided by View pulldown menu 92 include Selection and Composite. Accordingly, either the selected layer may be viewed in isolation or alternatively the composite may be viewed (taking into account all other layers below the selected layer). The view options provided by View pulldown menu 94 include Element and Material. The Element view is the combination of the image raster modified by any associated spatial transform. The Material view is the image raster unaffected by the spatial transform. For example, FIG. 3B illustrates the corkscrew image raster modified by a rotation and scale spatial transform. FIG. 3C, which illustrates only the image raster material, shows the corkscrew image raster before the spatial transform has been applied.

A user may use the eye icon and View pull-down menus to select a desired perspective of the composite image for display. Painting may be performed on any element that is selected for display. The pixel data in the underlying image raster is dynamically updated during the painting process. As a result, when the brush strokes are completed during painting of any displayed element, the appropriate pixels are modified in the underlying image raster such that the processing of the underlying image raster, as defined by the image processing tree, results in the correct image being displayed.

For example, in FIG. 3A the corkscrew image raster is selected for painting, while the selected view is the entire composite image (as indicated by eye icon 95 and View pull-down menu 92). An ellipse 83 is painted on the corkscrew image raster. Note that the effects of processing functions that are relatively higher in the image processing tree hierarchy than the selected element that is painted may be viewed during painting. Thus, the painted ellipse is blurred as a result of Box Blur process 98.

To view the element without viewing the affects of processes relatively higher in the hierarchy, the View pull-down menu may be changed from Composite to Selection. Thus, in FIG. 3B, the element that includes the corkscrew image raster with the painted ellipse 83 is shown, without the blurring and paste processes that are relatively higher in the hierarchy than the corkscrew element.

The corkscrew element of FIG. 3B still reflects the processing of the image raster with the rotate and scale spatial transform applied to the image raster. The image raster, after it has been painted with the ellipse and before it has had any processing performed on it is shown in FIG. 3C. In FIG. 3C, the View pull-down menu 94 has been modified to select Material rather than Element. When comparing FIG. 3A to FIG. 3C, it can be seen that the pixel locations affected by the brush strokes on the composite image are transformed such that the appropriate pixel locations of the image raster are modified during the paint process. The selection of pixel locations for modification in the image raster is performed by applying the reverse effects of all of the spatial transforms in the image processing tree between the displayed layer (at which painting occurs) and the selected element (which includes the image raster) to the pixel locations indicated by the brush strokes.

In order to reverse the effects of the spatial transforms between the displayed layer and the selected element, the inverse spatial transforms are applied to the values of the pixel locations affected by the brush strokes. An allowance is also made for the changing geometry of the brush stroke profile. For example, for a given brush profile, if the image raster had been scaled down by a factor of two at the displayed, painted layer, then the brush profile is scaled up by a factor of two when the stroke is applied to the image raster.

Although the example of FIGS. 3A–3C illustrates only one layer affected by one spatial transform, a composite image may be formed from tens of layers. Each of the layers may be processed by an associated spatial transforms, and groups of layers may also be processed by spatial transforms. Therefore, the reverse translation process may involve the application of numerous inverse spatial transforms to the pixel coordinates of the brush strokes in order to ensure that the image raster is accurately painted. The data structures incorporated in the image processing tree allow for fast, accurate update of image raster in response to the painted brush strokes.

Figure 4:
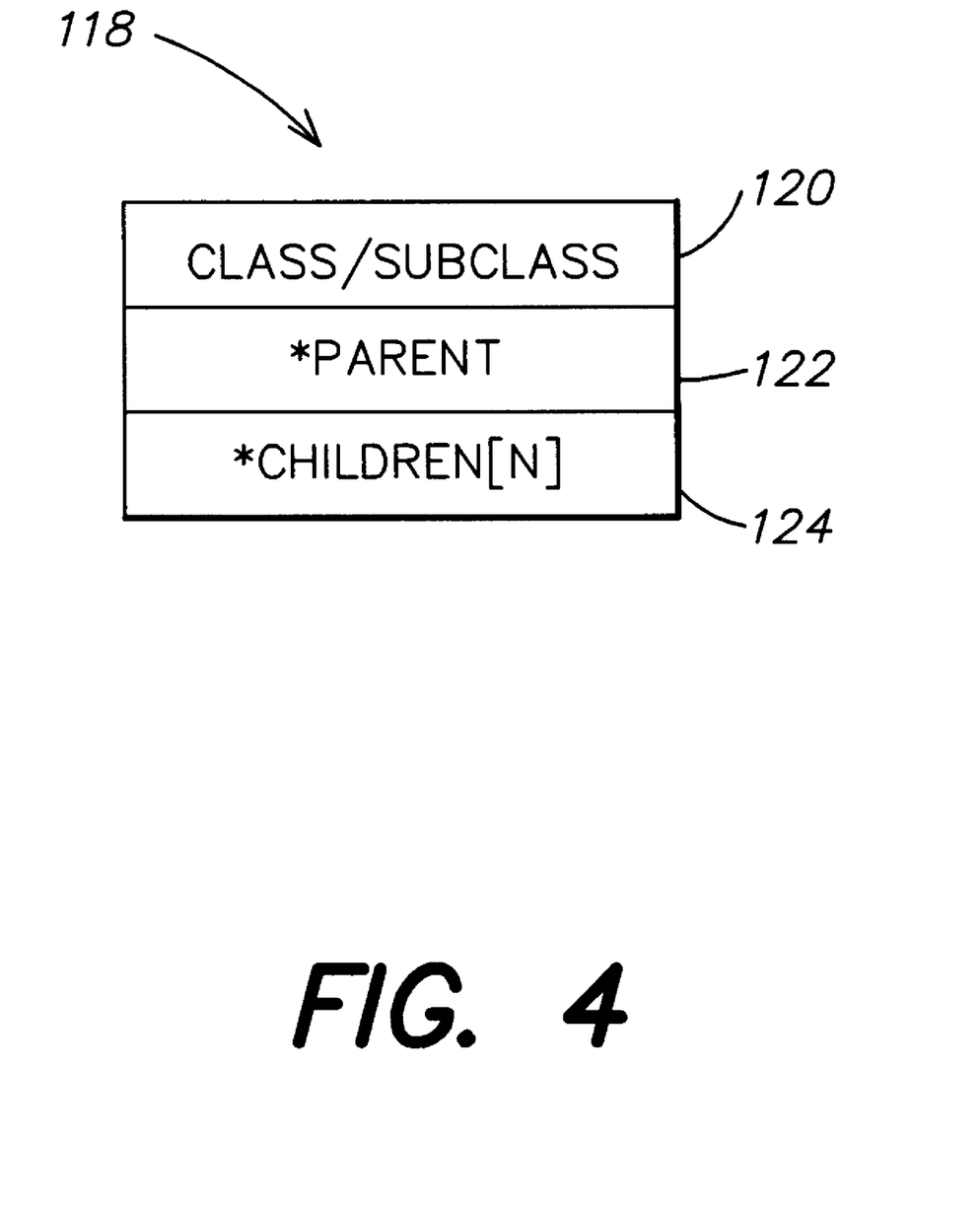
FIG. 4 is a block diagram of an example data structure used in the image processing data structure of FIG. 2A.

One example of a data structure 118 that may be used to define an element in the image processing tree is illustrated in FIG. 4. The image processing tree is a tree of coupled elements. The data structure 118 of each element includes a class/subclass field 120, a reference 122 to a parent element in the tree and a reference 124 to an array of children elements in the tree. If there are no children associated with this element, the value at the location in the array is Null.

The data structure 118 may also include a number of other fields depending upon the class of the element. Available classes of elements include: ShapeElements, ProcessElements, and MaterialElements. ShapeElements identify one of a set of predefined shape objects that are made available with the paint application. A data structure of a ShapeElement class includes a reference to one of the predefined shapes.

ProcessElements identify a process that is performed on elements that are relatively lower in the hierarchy than the process element (i.e, any children of the process element). The functions identified by the process elements include blurring, tinting, and other filter processes. The data structure of a Process Element includes a reference to the function associated with the process.

MaterialElements identify raster images. Pixel information in the raster image may be provided in a variety of formats, such as Red, Green, Blue, Alpha (RGBA) format, CCIR 601 4:2:2 format or other well known pixel formats. The MaterialElement class includes ImageElement and MatteElement sub-classes. The ImageElement sub-class further includes a CompositionElement sub-class. The data structure of each MaterialElement includes a reference to a source image and pointer to a 3×3 matrix defining the spatial transform process that is performed on the source image. The source image is either an image raster, a shape, or another image element (when the image element is a CompositionElement). The data structure of the ImageElement sub-class further includes a reference to a paste process and a reference to a node in the image processing tree where the paste process is connected. The MatteElement sub-class identifies Alpha images, which provide transparency information. The data structure of a CompositionElement further includes a reference to the paste process and is used to reflect the merging of elements that are relatively lower in the hierarchy.

The ImageLinkElement is an element that includes a link to an ImageElement. Similarly, the MatteLinkElement is an element for providing a link to any Element.

As the user adds images or processes into the image processing tree hierarchy, a routine called MakeConnections is invoked. The MakeConnection routine forms the appropriate links between the newly added element and the image processing tree by updating the parent and children data in each of the elements to reflect the addition of the new element into the image processing tree.

Figure 5:
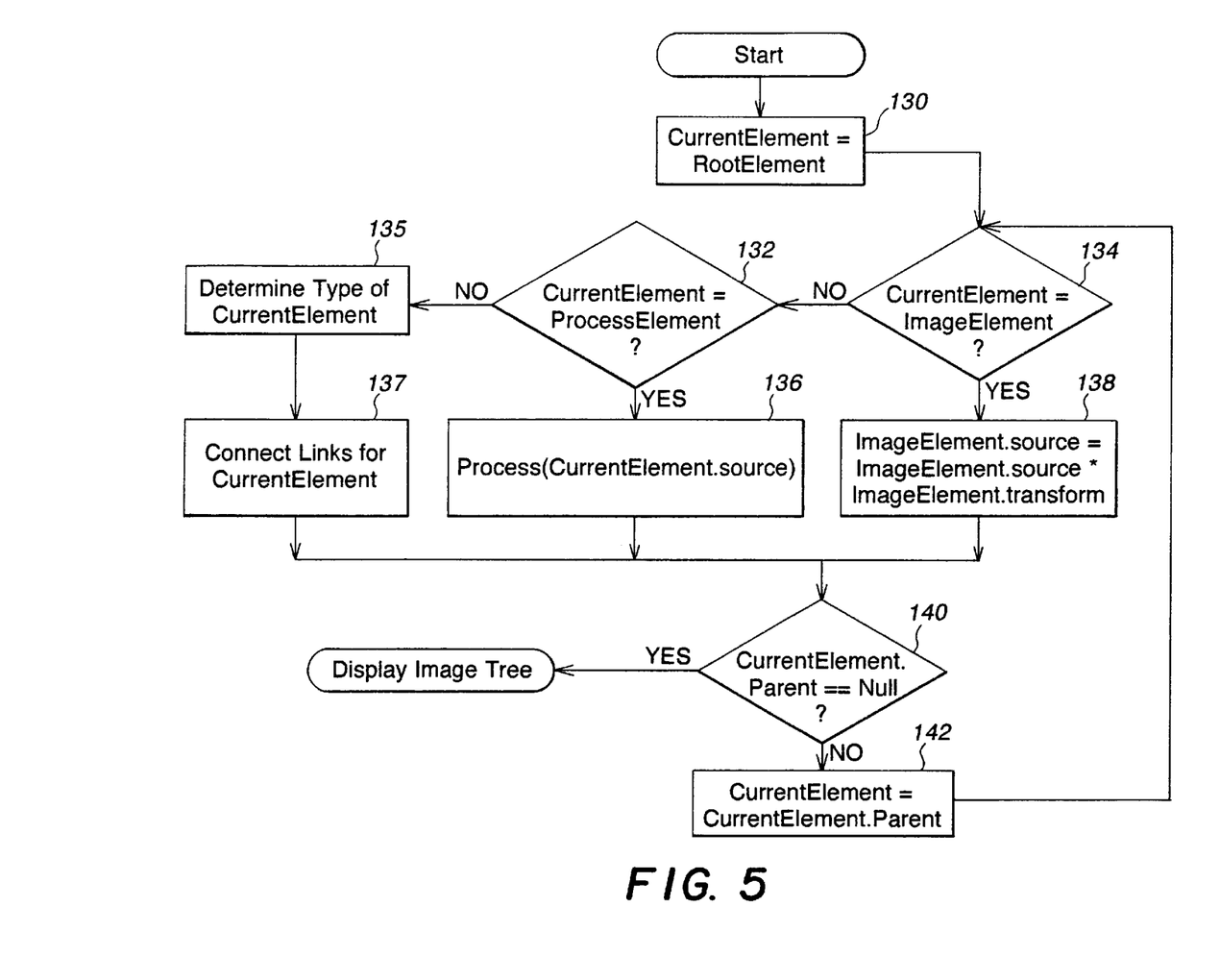
FIG. 5 is a block diagram of one embodiment of a process for building an image processing data structure using elements defined by the data structure of FIG. 4.

In one embodiment, all of the leaf elements are stored in a file. The leaf elements are used to identify starting points for processing branches of the image processing tree and are generally associated with an image raster, where the image rasters include image clips, bit maps and shapes. FIG. 5 illustrates one example of a method for generating the image processing tree. At step 130, one of the leaf elements is selected as a CurrentElement for processing. The processing steps 130–142 are followed for each leaf in the image processing tree, although for purposes of clarity only one will be described herein. At step 134, the class of the CurrentElement is checked to determine whether it is an ImageElement. If so, at step 138, the source of the image element, which is either image raster material another image element (if the ImageElement is a CompositionElement), is transformed according to the spatial transform of the ImageElement. If the CurrentElement is not an ImageElement, then at step 132 it is determined whether the CurrentElement is a ProcessElement. If the CurrentElement is a Process Element, then at step 136 the process associated with the CurrentElement is applied to the children associated with the CurrentElement. If the CurrentElement is not a ProcessElement or an ImageElement, the process continues at step 135 to determine the type of element and connect the image processing tree appropriately. Once the type of the CurrentElement has been determined and the processing of the CurrentElement has occurred, at step 140 it is determined whether the CurrentElement has an associated Parent Element. If so, at step 142, the CurrentElement is updated to point to the ParentElement, and the processing returns to step 134. The process of traversing up the image processing tree from the leaf to the highest element (i.e., the root element) continues until all elements in the tree have been processed.

The image processing tree that is generated using the MakeConnections routine is used both for display purposes and for processing pixels during paint operations. During painting, a user paints a desired pattern on the viewed image raster. However, because the viewed image raster may have undergone numerous transforms and processing before viewing, there is not generally a one to one correspondence between the brush strokes applied by the user and the effect of the painting on the underlying image raster.

Thus, in order for the changes that are made to an image raster during painting to be displayed correctly, an adjustment is made to the brush strokes so that, after their application to the image material, the desired displayed image may be obtained. Any spatial transforms that have been applied to the image raster between the level of the image raster material and the viewing level are applied in the inverse to the brush strokes to ensure that the correct brush strokes are applied to the image raster. Thus, if a series of spatial transforms have scaled the image raster by ½, and rotated it by 45 degrees to achieve the viewed composite image, the brush strokes would be applied spatial transforms to multiply them by 2 and rotate them by −45 degrees.

Figure 6:
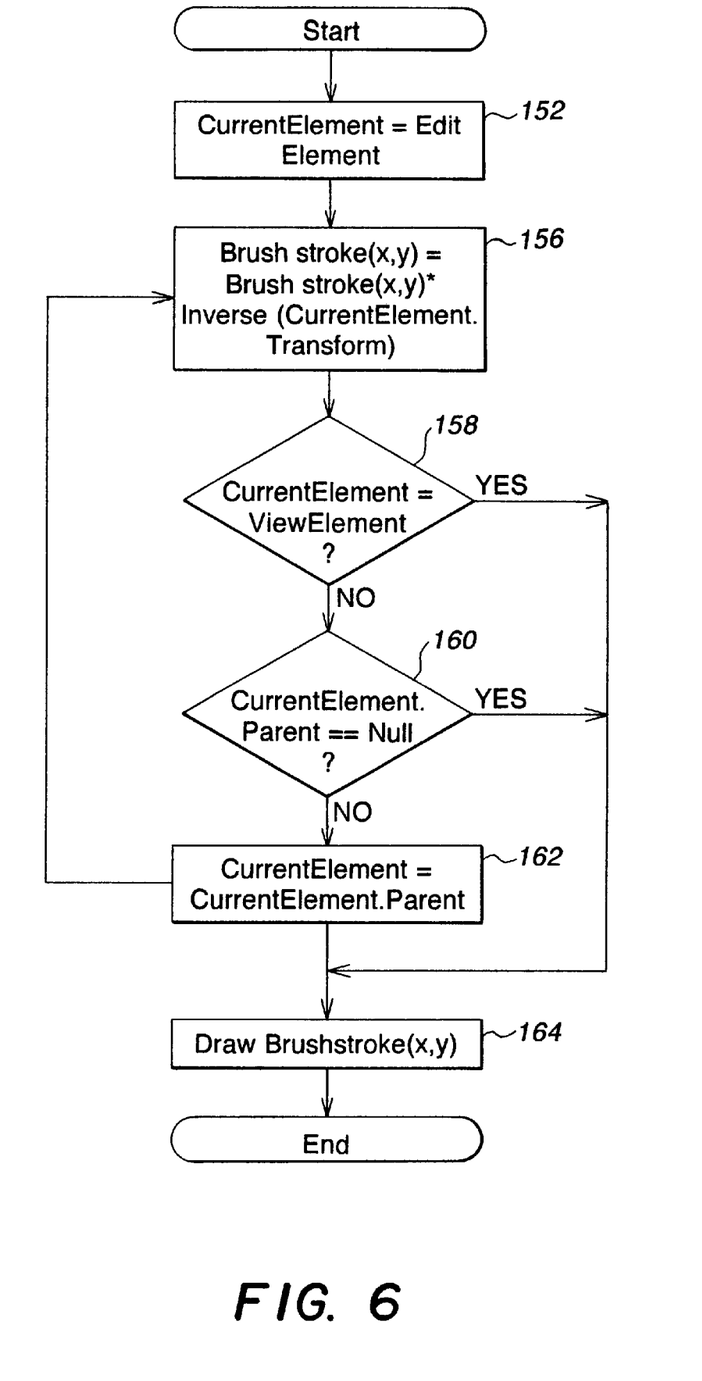
FIG. 6 is a block diagram of one embodiment of a process for transforming brush stroke coordinates when painting a layer within the image processing data structure of FIG. 2A.

FIG. 6 illustrates one embodiment of a method for transforming the brush strokes between the viewed image layer and the edited image raster. The brush strokes typically may be defined as lines, having start and end coordinates, or as discrete pixels having pixel coordinates. In the method, an EditElement is the element that is selected for editing, and the ViewElement is the element that is currently being viewed. At step 152, a CurrentElement variable is set equal to the EditElement. At step 156, the inverse spatial transform of the CurrentElement is applied to the brush stroke. In particular, the coordinates of the pixels that define the brush stroke are transformed according to the inverse spatial transform to provide updated pixel coordinates. At step 158 it is determined whether the CurrentElement is the ViewElement. If it is the view element, then all inverse spatial transforms have been applied to the brush stroke, and the process proceeds to step 164. If not, the process continues to step 160 where it is determined whether there is a Parent element for the CurrentElement. If there is a Parent element, the process proceeds to step 162, where the Parent element is copied to the CurrentElement, and the process returns to step 156. If there is no Parent element then the element was the highest in the hierarchy, the Parent element value is null, and the process proceeds to step 164, where the process Draw Brush stroke draws the pixel coordinates at the transformed Brushstroke(x,y) locations.

When applying the spatial transforms and inverse spatial transforms to pixel coordinates, the general equations provided below are used. For ease of explanation, assume the spatial transform is a 2×2 spatial transform A defined by Equation I below:
Equation I:

$$A = \begin{bmatrix} a & b \\ c & d \end{bmatrix}$$

Applying the spatial transform to the (x,y) coordinates of a pixel would yield updated pixel coordinates (ax+by, cx+dy). If ad≠bc, the inverse spatial transform of A is determined by the below Equation II:
Equation II:

$$A^{-1} = \frac{1}{ad-bc} \begin{bmatrix} d & -b \\ -c & a \end{bmatrix}$$

While the above process may be used to ensure that the angle and extent of the brush strokes is applied appropriately to the image raster material, the profile of the brush that is used to apply the brush strokes is also adjusted to ensure that the appropriate pixels in the image raster are updated. The brush profiles are selected at the layer at which painting is performed, prior to the step of painting. Because there may be many spatial transforms between the ViewElement layer and the EditElement layer, the profile of the brush at the ViewElement layer may not match that at the EditElement layer. For example, a thin line drawn on an object that has been reduced in size by ten will appear thicker once the object has been returned to its original size.

Figure 7:
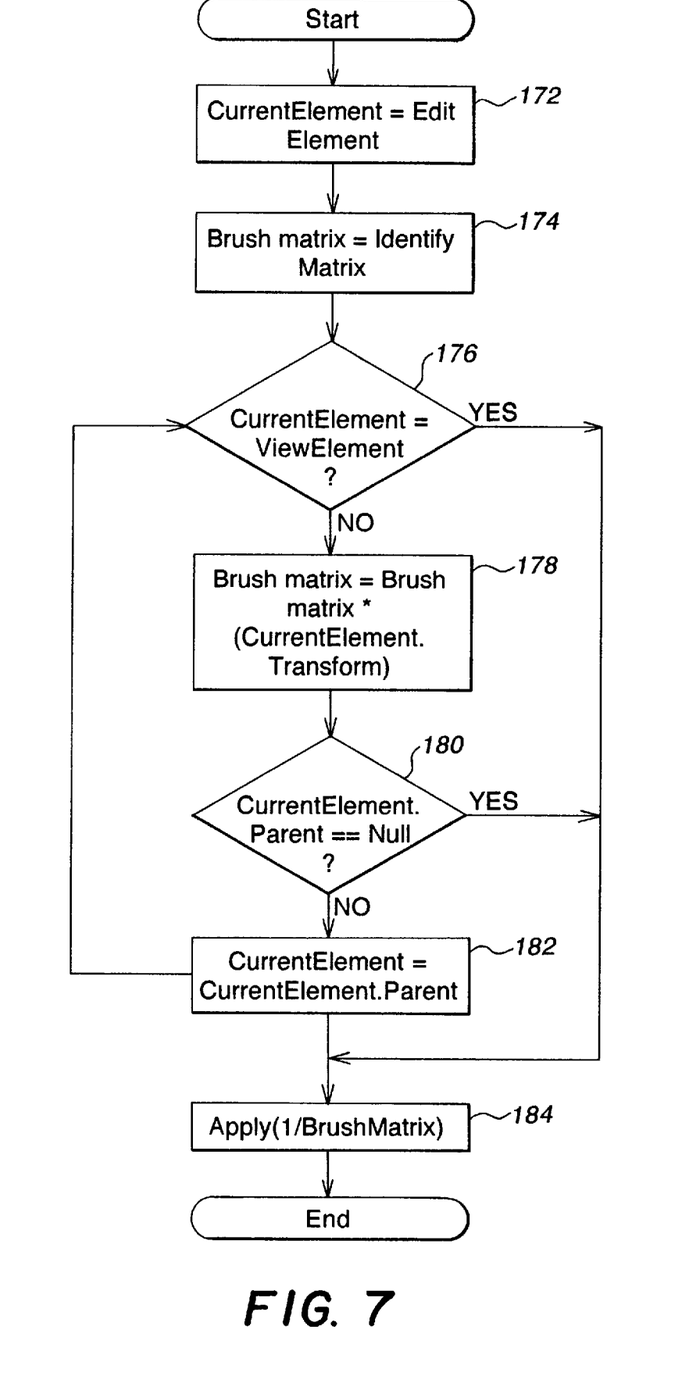
FIG. 7 is a block diagram of one embodiment of a process for transforming brush profiles for painting a layer within the image processing tree of FIG. 2A.

One embodiment of a method that may be used to transform the brush profile such that the appropriate pixels are modified in the image raster is shown in FIG. 7. At step 172, a CurrentElement variable is initialized to the selected EditElement. At step 174, a Brush matrix is initialized to the Identity matrix. At step 176, it is determined whether the CurrentElement and the ViewElement are the same. If not, at step 178, the brush matrix is multiplied by the current elements spatial transformation matrix. The process proceeds to step 180, where it is determined whether there is a Parent element associated with the CurrentElement. If so, at step 182 the CurrentElement is set to the Parent element, and the process returns to step 176. When it is determined at step 176 that the CurrentElement is equal to the ViewElement, or when it is determined at step 180 that there is no Parent element, then at step 184 the inverse of the calculated brush matrix is applied to the brush stamps to provide the modified brush profile.

Figure 8:
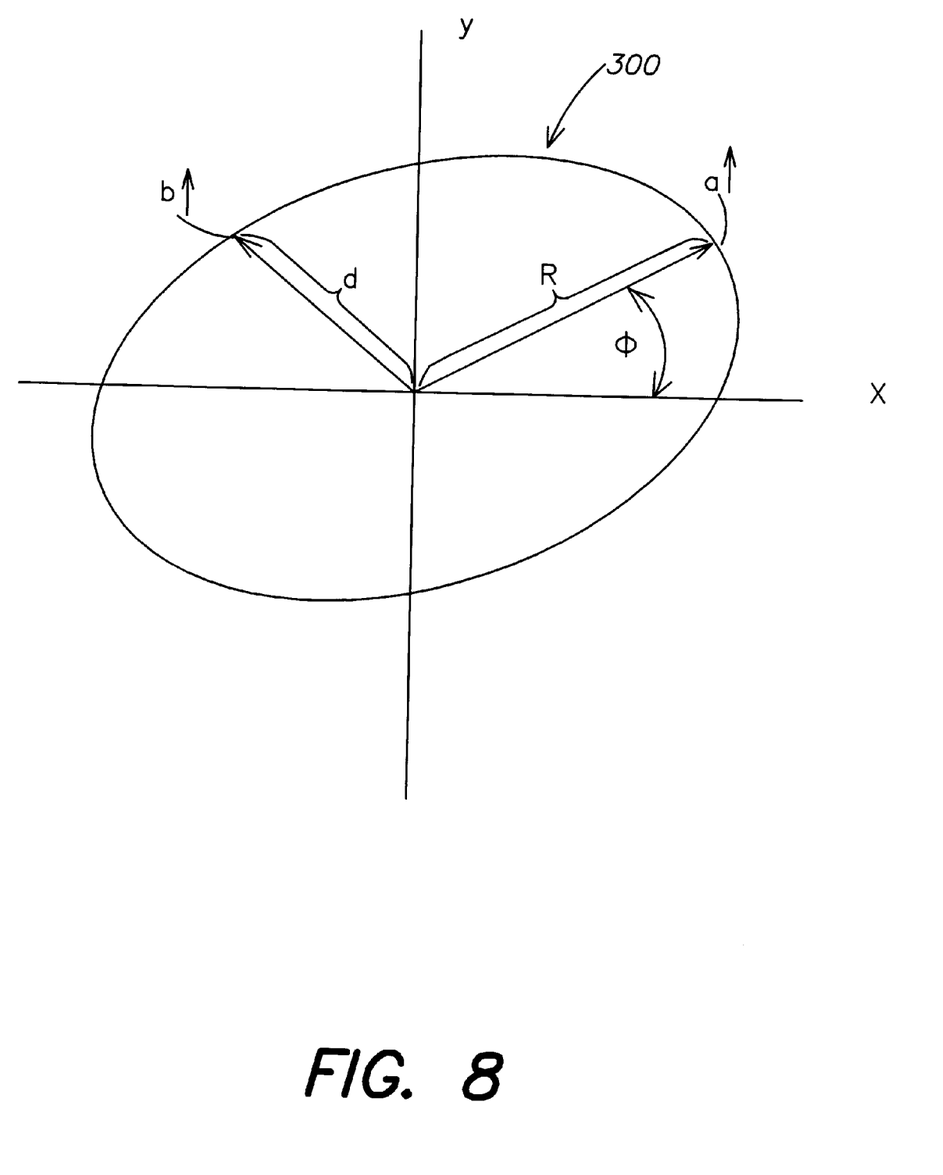
FIG. 8 is a diagram of a brush profile that may be transformed using the process described in FIG. 7.

One example of a brush profile 300 is shown origin centered in FIG. 8. Because the brush profile has a canonical ellipse shape, the geometry used to apply the transforms to the brush strokes is slightly different than that described above in Equations I and II. The equation of a connonical ellipse of a circle with radius of one is denoted by the equation $x^2+y^2=1$. This equation may be rewritten as shown below in Equation III:
Equation III:

$$[x \ y] \begin{bmatrix} 1 & 0 \\ 0 & 1 \end{bmatrix} \begin{bmatrix} x \\ y \end{bmatrix} = 1$$

Applying the successive inverse transforms to the above equation may be performed using below Equation IV, where S is a symmetric matrix:
Equation IV:

$$[x \ y] S \begin{bmatrix} x \\ y \end{bmatrix} = 1$$

The above equation may be used to apply successive transforms to the brush stamp 300. However, an accommodation is also made for the changes in the radius, angle and flatness of the brush stamp as a result of the transforms. The variables defining the brush stamp are R, identifying the radius of the stamp, d, identifying the minor axis, i.e., flatness, of the stamp, and φ identifying the angle of the stamp.

Since the matrix S is symmetric, it can be shown that there are two orthonormal vectors $a\uparrow$ and $b\uparrow$ such $Sa\uparrow=\lambda_1 a\uparrow$, $Sb=\lambda_2 b\uparrow$ where $\lambda_1 \geq \lambda_2 \geq 0$.

Since $a\uparrow$, $b\uparrow$ are orthogonal, $[xy]=ja\uparrow+kb\uparrow$ for some j and k, where j and k are any real numbers. The equation used to transform the brush stamp using the symmetric matrix S to obtain updated R, d and φ values (where φ is the angle between R and the x axis) is provided below in Equation V:

Equation V:

$$\frac{j^2}{(1-F^2)} + k^2 = R^2 \quad \text{where:}$$

$$R = \frac{1}{\sqrt{\lambda_2}} \qquad F = \sqrt{1 - \frac{\lambda_2}{\lambda_1}} \qquad d = R(1-F)$$

A layer based paint system that operates using an image processing data structure, such as a tree, has been described. The image processing data structure is formed from linked image elements and process elements. By separating image elements from process elements, the image raster at an image element may be modified without un-doing any processing that is done at higher layers of the composite image. As a result, painting may be performed while viewing the effects of subsequent processes on the painted image element.

The image raster of an image element also may be directly modified using the paint process. Each image element may have one or more spatial transform performed on the image element prior to its display at a painting level. The coordinates of the painted brush strokes are transformed into coordinates of the image raster by iteratively tracing back through the image processing tree and applying the spatial transforms in the inverse to the brush strokes. The brush profile also may be adjusted in a similar mainer.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of displaying a composite image represented by a hierarchically ordered coupling of elements, the elements including a reference to a parent element and references to any child elements, the elements apportioned into classes including image elements and process elements, the image elements including an image raster and at least one transform, the method comprising the steps of:

a) designating all the elements at the lowest level of the hierarchically ordered coupling of elements as current working elements;

b) for each current working element that is an image element, transforming the image raster using the associated image element transform;

c) for each current working element that is a process element, processing the coupled children according to a process associated with the process element;

d) designating the parent elements of the working elements as the working elements;

e) repeating steps b through d until all of the elements in the image processing tree have been processed; and f) displaying an image defined by the image processing tree on the display screen.

* * * * *